(12) United States Patent
Kashiwamura et al.

(10) Patent No.: US 8,380,395 B2
(45) Date of Patent: Feb. 19, 2013

(54) VEHICLE CONTROL APPARATUS

(75) Inventors: Satoshi Kashiwamura, Obihiro (JP); Hiroyuki Shimizu, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 357 days.

(21) Appl. No.: 12/879,172

(22) Filed: Sep. 10, 2010

(65) Prior Publication Data

US 2011/0066326 A1 Mar. 17, 2011

(30) Foreign Application Priority Data

Sep. 16, 2009 (JP) ................................. 2009-214246

(51) Int. Cl.
*B60G 17/016* (2006.01)

(52) U.S. Cl. .................... 701/38; 280/5.506; 280/5.507; 280/5.515; 188/280

(58) Field of Classification Search .............. 701/36–39; 73/11.04; 280/5.5, 5.505–5.507, 5.515; 188/280, 188/281
See application file for complete search history.

(56) References Cited

U.S. PATENT DOCUMENTS

| | | | | | |
|---|---|---|---|---|---|
| 3,625,301 | A | * | 12/1971 | Joyslen | 180/437 |
| 4,900,056 | A | * | 2/1990 | Fukushima et al. | 280/5.508 |
| 5,056,813 | A | * | 10/1991 | Shibata et al. | 280/5.506 |
| 5,117,934 | A | * | 6/1992 | Tsuyama et al. | 180/197 |
| 5,127,667 | A | * | 7/1992 | Okuda et al. | 280/5.513 |
| 5,161,816 | A | * | 11/1992 | Okuda et al. | 280/5.515 |
| 5,239,471 | A | * | 8/1993 | Takahashi | 701/37 |
| 5,269,556 | A | * | 12/1993 | Heyring | 280/5.508 |
| 5,328,256 | A | * | 7/1994 | Ohta et al. | 303/146 |
| 5,423,602 | A | * | 6/1995 | Takahashi | 303/119.2 |
| 5,692,587 | A | * | 12/1997 | Fratini, Jr. | 188/266.2 |
| 5,696,677 | A | * | 12/1997 | Leaphart et al. | 701/37 |
| 5,890,084 | A | * | 3/1999 | Halasz et al. | 701/45 |
| 5,897,130 | A | * | 4/1999 | Majeed et al. | 280/5.507 |
| 6,064,931 | A | * | 5/2000 | Sawada et al. | 701/41 |
| 6,237,504 | B1 | * | 5/2001 | Tanahashi et al. | 104/243 |
| 6,256,569 | B1 | * | 7/2001 | Kobayashi | 701/70 |
| 6,266,602 | B1 | * | 7/2001 | Yamaura | 701/80 |
| 6,519,517 | B1 | * | 2/2003 | Heyring et al. | 701/37 |
| 2008/0272561 | A1 | * | 11/2008 | Monk et al. | 280/5.507 |

FOREIGN PATENT DOCUMENTS

| | | |
|---|---|---|
| EP | 0 795 429 A2 | 9/1997 |
| JP | 9-249016 | 9/1997 |

OTHER PUBLICATIONS

Swevers et al, A Model-Free Control Structure for the On-Line Tuning of the Semi-Active Suspension of a Passenger Car, Mechanical Systems and Signal Processing, vol. 21, Iss. 3, Apr. 2007, pp. 1422-1436.*

* cited by examiner

*Primary Examiner* — Russell Frejd
(74) *Attorney, Agent, or Firm* — Antonelli, Terry, Stout & Kraus, LLP.

(57) ABSTRACT

A vehicle control apparatus including a road wheel speed detecting section, a vehicle body speed detecting section, a slip ratio calculating section configured to calculate slip ratios which are ratios of respective road wheel speeds with respect to vehicle body speed, an anti-skid brake control section configured to control wheel cylinder fluid pressures for respective wheel cylinders such that the slip ratios fall within a predetermined range, a wheel cylinder fluid pressure acquiring section, damping force variable shock absorbers which are disposed between the respective road wheels and the vehicle body and constructed to variably adjust respective damping force characteristics thereof, and a damping force variable shock absorber control section configured to set the damping force characteristics in accordance with the acquired wheel cylinder fluid pressures.

20 Claims, 5 Drawing Sheets

VEHICLE CONTROL APPARATUS

BACKGROUND OF THE INVENTION

The present invention relates to a vehicle control apparatus.

Japanese Patent Application Unexamined Publication No. 9-249016 discloses an apparatus for controlling damping force characteristics of vehicular shock absorbers in accordance with sprung mass vertical velocities and slip ratios of road wheels of the vehicle.

SUMMARY OF THE INVENTION

In the above-described control apparatus of the conventional art, the damping force characteristics of vehicular shock absorbers are controlled on the basis of vehicle attitude. Therefore, there will occur a delay in controlling the damping force characteristics of the shock absorbers in response to change in the vehicle attitude.

It is an object of the present invention to solve the above-described problem in the apparatus of the conventional art and to provide a vehicle control apparatus capable of suppressing a delay in controlling damping force characteristics of vehicular shock absorbers in response to change in the vehicle attitude.

The other objects and features of this invention will become understood from the following description with reference to the accompanying drawings.

In a first aspect of the present invention, there is provided a vehicle control apparatus comprising:

a road wheel speed detecting section configured to detect road wheel speeds of respective road wheels of a vehicle;

a vehicle body speed detecting section configured to detect a vehicle body speed;

a slip ratio calculating section configured to calculate slip ratios which are ratios of the respective road wheel speeds with respect to the vehicle body speed;

an anti-skid brake control section configured to control wheel cylinder fluid pressures for respective wheel cylinders such that the slip ratios fall within a predetermined range;

a wheel cylinder fluid pressure acquiring section configured to acquire the wheel cylinder fluid pressures;

damping force variable shock absorbers disposed between the respective road wheels and the vehicle body, the damping force variable shock absorbers being constructed to variably adjust respective damping force characteristics thereof, and a damping force variable shock absorber control section configured to set the damping force characteristics in accordance with the acquired wheel cylinder fluid pressures.

In a further aspect of the present invention, there is provided a vehicle control apparatus comprising:

road wheel speed sensors which detect road wheel speeds of respective road wheels of a vehicle;

a vehicle body speed calculating section configured to calculate a vehicle body speed on the basis of the detected road wheel speeds;

a slip ratio calculating section configured to calculate slip ratios which are ratios of the respective road wheel speeds with respect to the vehicle body speed;

an anti-skid brake control section configured to control wheel cylinder fluid pressures for respective wheel cylinders such that the slip ratios fall within a predetermined range;

a wheel cylinder fluid pressure acquiring section configured to acquire the wheel cylinder fluid pressures;

a wheel cylinder fluid pressure correction value calculating section configured to correct the acquired wheel cylinder fluid pressures in accordance with an operating state of the anti-skid brake control section;

damping force variable shock absorbers disposed between the respective road wheels and the vehicle body, the damping force variable shock absorbers being constructed to variably adjust respective damping force characteristics thereof, and a damping force variable shock absorber control section configured to set the damping force characteristics in accordance with the corrected wheel cylinder fluid pressures.

In a still further aspect of the present invention, there is provided a vehicle control apparatus comprising:

a road wheel speed detecting means for detecting road wheel speeds of respective road wheels of a vehicle;

a vehicle body speed detecting means for detecting a vehicle body speed;

a slip ratio calculating means for calculating slip ratios which are ratios of the respective road wheel speeds with respect to the vehicle body speed;

an anti-skid brake control means for controlling wheel cylinder fluid pressures for respective wheel cylinders such that the slip ratios fall within a predetermined range;

a wheel cylinder fluid pressure acquiring means for acquiring the wheel cylinder fluid pressures;

damping force variable shock absorbers disposed between the respective road wheels and the vehicle body, the damping force variable shock absorbers being constructed to variably adjust respective damping force characteristics thereof, and a damping force variable shock absorber control means for setting the damping force characteristics to harder damping force characteristics as the acquired wheel cylinder fluid pressures become higher.

DETAILED DESCRIPTION OF THE INVENTION

First Embodiment

General Construction

Figure 1:
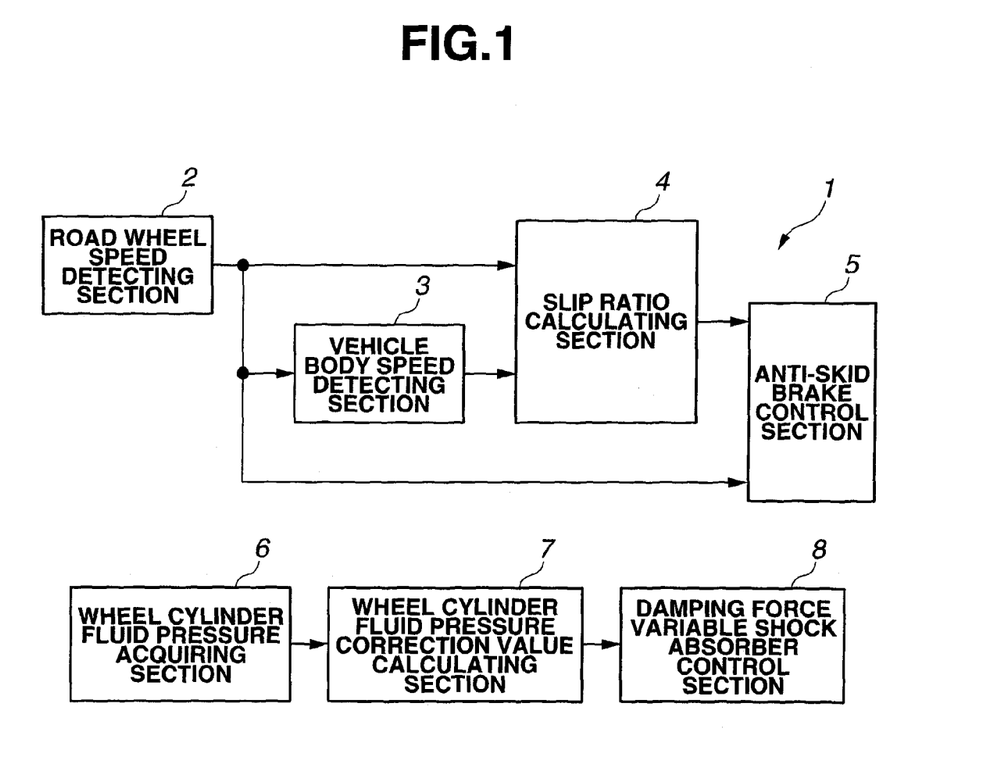
FIG. 1 is a schematic diagram showing a construction of a vehicle control apparatus according to a first embodiment of the present invention.

A vehicle control apparatus according to a first embodiment of the present invention will be explained hereinafter with reference to the accompanying drawings. The vehicle control apparatus of the first embodiment includes an anti-skid brake system (ABS) which acts to prevent road wheels from being locked upon sudden braking, and a damping force variable shock absorber system which controls a vehicle attitude. FIG. 1 is a schematic diagram showing a construction of the vehicle control apparatus according to the first embodiment. As illustrated in FIG. 1, vehicle control apparatus 1 includes road wheel speed detecting section 2, vehicle body speed detecting section 3, slip ratio calculating section 4 and anti-skid brake control section 5 which constitute the anti-skid brake system. Vehicle control apparatus 1 also includes wheel cylinder fluid pressure acquiring section 6, wheel cylinder fluid pressure correction value calculating section 7 and damping force variable shock absorber control section 8 which constitute the damping force variable shock absorber system. Wheel cylinder fluid pressure correction value calculating section 7 is configured to correct the acquired wheel cylinder fluid pressures in accordance with an operating state of anti-skid brake control section 5.

Figure 2:
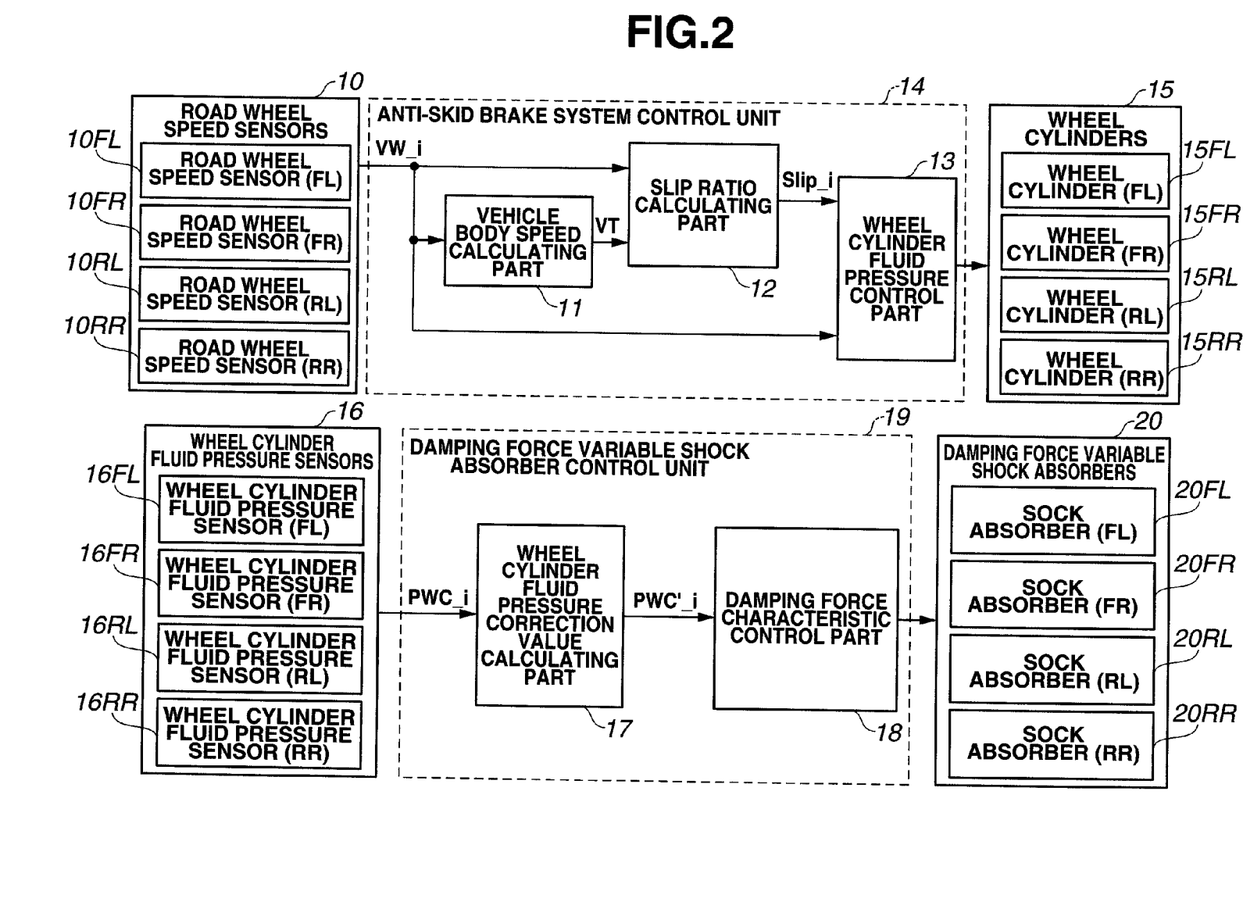
FIG. 2 is a control block diagram of the vehicle control apparatus according to the first embodiment of the present invention.

FIG. 2 is a control block diagram of vehicle control apparatus 1. In the following description, reference signs FL, FR, RL and RR denote a front left road wheel, a front right road wheel, a rear left road wheel and a rear right road wheel, respectively. As illustrated in FIG. 2, vehicle control apparatus 1 includes road wheel speed detecting part 10, anti-skid brake system control unit 14, wheel cylinder part 15, wheel cylinder fluid pressure acquiring part 16, damping force variable shock absorber control unit 19, and damping force variable shock absorber part 20. Road wheel speed detecting part 10 is constituted of road wheel speed detecting section 2 as shown in FIG. 1 and includes road wheel speed sensors 10FL, 10FR, 10RL, 10RR which are provided on respective road wheels. Anti-skid brake system control unit 14 executes anti-skid brake control. Wheel cylinder part 15 is constituted of wheel cylinders 15FL, 15FR, 15RL, 15RR which are provided on respective road wheels FL, FR, RL, RR and apply a braking force to respective road wheels FL, FR, RL, RR. Wheel cylinder fluid pressure acquiring part 16 constitutes wheel cylinder fluid pressure acquiring section 6 as shown in FIG. 1 and includes wheel cylinder fluid pressure sensors 16FL, 16FR, 16RL, 16RR. Damping force variable shock absorber part 20 includes damping force variable shock absorbers 20FL, 20FR, 20RL, 20RR which have variable damping force characteristics and act to control vehicle attitude. Damping force variable shock absorbers 20FL, 20FR, 20RL, 20RR are hereinafter simply referred to as "shock absorbers 20". Damping force variable shock absorber control unit 19 executes controlling damping force variable shock absorbers 20.

Figure 3:
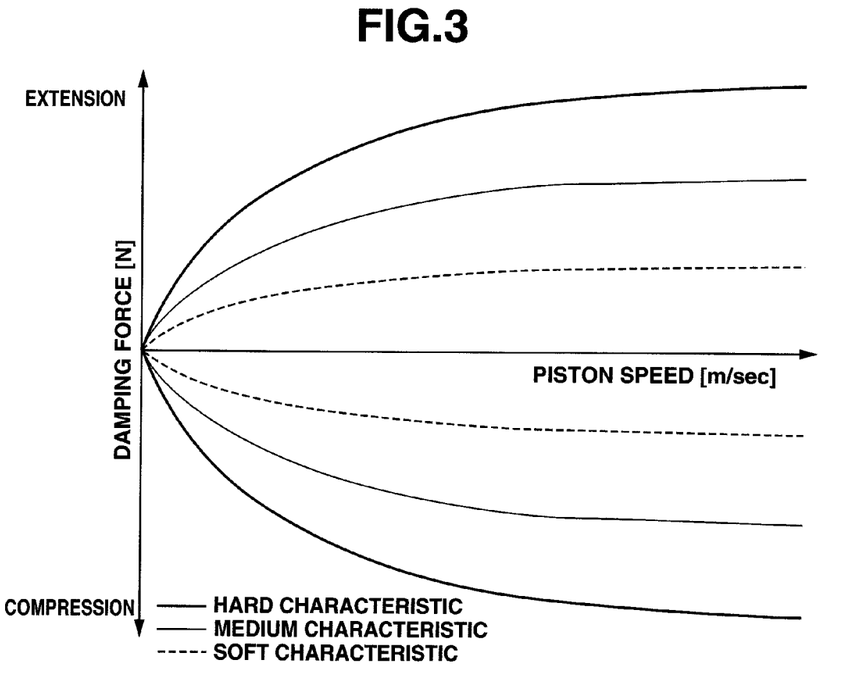
FIG. 3 is a graph illustrating damping force characteristic of a shock absorber of the vehicle control apparatus according to the first embodiment of the present invention.

Each of shock absorbers 20 is constructed to steplessy and variably adjust a damping force characteristic thereof over the range from a soft (or small) damping force characteristic to a hard (or large) damping force characteristic. FIG. 3 is a graph illustrating the damping force characteristic of each of shock absorbers 20 with respect to speed of a piston in each of shock absorbers 20. As illustrated in FIG. 3, shock absorber 20 has such a damping force characteristic that the damping force becomes larger as the piston speed is increased. Further, as shown in FIG. 3, each of shock absorbers 20 is constructed to increase the damping force in the order of a soft damping force characteristic, a medium damping force characteristic and a hard damping force characteristic. The soft damping force characteristic has a small curvature as indicated by a broken line curve. The hard damping force characteristic has a large curvature as indicated by a thickened solid line curve. The medium damping force characteristic having a medium curvature between the small curvature and the large curvature as indicated by a thinned solid line curve. That is, the soft damping force characteristic has a small rate of change in damping force with respect to piston speed, the hard damping force characteristic has a large rate of change in damping force with respect to piston speed, and the medium damping force characteristic has a medium rate of change in damping force with respect to piston speed between the large rate and the small rate.

Anti-skid brake system control unit 14 includes vehicle body speed calculating part 11 which serves as vehicle body speed detecting section 3, slip ratio calculating part 12 which serves as slip ratio calculating section 4, and wheel cylinder fluid pressure control part 13 which serves as anti-skid brake control section 5. Wheel cylinder fluid pressure control part 13 controls fluid pressures in respective wheel cylinders 15 (hereinafter referred to as "wheel cylinder fluid pressures") by regulating opening degrees of solenoid valves in a hydraulic control unit disposed in a brake hydraulic circuit of the brake system. Damping force variable shock absorber control unit 19 includes wheel cylinder fluid pressure correction value calculating part 17 which serves as wheel cylinder fluid pressure correction value calculating section 7, and damping force characteristic control part 18 which serves as damping force variable shock absorber control section 8.

Road wheel speed sensors 10FL, 10FR, 10RL, 10RR detect road wheel speeds VW_FL, VW_FR, VW_RL, VW_RR of road wheels FL, FR, RL, RR, respectively. Vehicle body speed calculating part 11 receives road wheel speeds VW_i, that is, road wheel speeds VW_FL, VW_FR, VW_RL, VW_RR from road wheel speed sensors 10FL, 10FR, 10RL, 10RR, respectively, and calculates vehicle body speed VT on the basis of road wheel speeds VW_i. Reference sign "i" used in the term "road wheel speeds VW_i" denotes positions of respective road wheels FL, FR, RL, RR. Vehicle body speed VT may be obtained by any suitable method. For instance, a highest value of road wheel speeds VW_i may be used as vehicle body speed VT. Otherwise, an average value of road wheel speeds VW_i of driven road wheels may also be used as vehicle body speed VT.

Slip ratio calculating part 12 receives vehicle body speed VT and road wheel speeds VW_i and calculates slip ratios Slip_i, that is, Slip_FL, Slip_FR, Slip_RL, Slip_RR of respective road wheels FL, FR, RL, RR on the basis of vehicle body speed VT and road wheel speeds VW_i. A ratio of respective road wheel speeds VW_i to vehicle body speed VT is obtained as slip ratio Slip_i. Similarly to the above explanation, reference sign "i" used in the term "slip ratios Slip_i" denotes positions of respective road wheels FL, FR, RL, RR.

Wheel cylinder fluid pressure control part 13 receives road wheel speeds VW_i and slip ratios Slip_i and controls the wheel cylinder fluid pressures on the basis of road wheel speeds VW_i and slip ratio Slip_i so as to avoid locking of road wheels FL, FR, RL, RR and maximize a braking force of tires on respective road wheels FL, FR, RL, RR. Wheel cylinder fluid pressure control part 13 has threshold values for reduction of the wheel cylinder fluid pressures which are obtained as predetermined values of slip ratios relative to vehicle body speed VT. In a case where road wheel speeds VW_i become lower than the threshold values, wheel cylinder fluid pressure control part 13 reduces the wheel cylinder fluid pressures. After that, in a case where the reduced road wheel speeds VW_i begin to increase, wheel cylinder fluid pressure control part 13 increases the wheel cylinder fluid pressures and repeatedly carries out increasing and reducing the wheel cylinder fluid pressures to thereby allow convergence of the slip ratios into suitable values.

Wheel cylinder fluid pressure sensors 16FL, 16FR, 16RL, 16RR detect wheel cylinder fluid pressures PWC_FL, PWC_FR, PWC_RL, PWC_RR for respective road wheels FL, FR, RL, RR. Wheel cylinder fluid pressure correction value calculating part 17 receives wheel cylinder fluid pressures PWC_i, that is, wheel cylinder fluid pressures PWC_FL, PWC_FR, PWC_RL, PWC_RR from wheel cylinder fluid pressure sensors 16FL, 16FR, 16RL, 16RR and calculates wheel cylinder fluid pressure correction values PWC'_i, that is, wheel cylinder fluid pressure correction values PWC'_FL, PWC'_FR, PWC'_RL, PWC'_RR for respective road wheels FL, FR, RL, RR on the basis of wheel cylinder fluid pressures PWC_i. The calculation of wheel cylinder fluid pressure correction values PWC'_i will be explained in detail later. Damping force characteristic control part 18 receives wheel cylinder fluid pressure correction values PWC'_i and sets the damping force characteristics of respective shock absorbers 20FL, 20FR, 20RL, 20RR on the basis of wheel cylinder fluid pressure correction values PWC'_i. Damping force characteristic control part 18 controls shock absorbers 20FL, 20FR, 20RL, 20RR so as to attain the set damping force characteristics.

[Calculation of Wheel Cylinder Fluid Pressure Correction Values]

Figure 4:
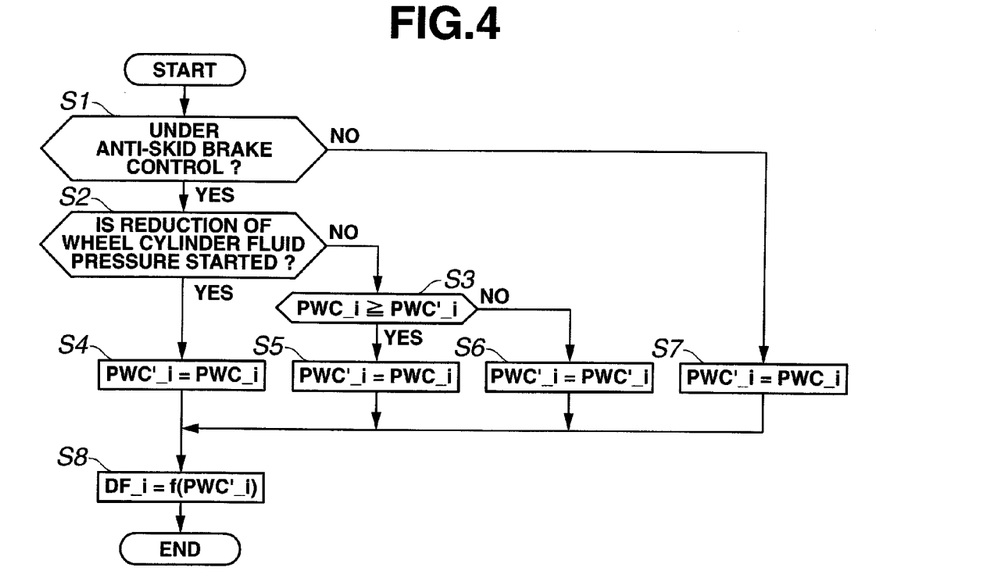
FIG. 4 is a flowchart of a logic flow of calculation of wheel cylinder fluid pressure correction values in the vehicle control apparatus according to the first embodiment of the present invention.

The calculation of wheel cylinder fluid pressure correction values PWC'_i is explained below. Wheel cylinder fluid pressure correction values PWC'_i are variables for changing the damping force characteristics of shock absorbers 20 in accordance with respective wheel cylinder fluid pressures PWC_i. Wheel cylinder fluid pressure correction values PWC'_i are basically set to the detected wheel cylinder fluid pressures PWC_i detected by wheel cylinder fluid pressure sensors 16FL, 16FR, 16RL, 16RR. However, during execution of the anti-skid brake control, wheel cylinder fluid pressure correction values PWC'_i are set to values obtained by correcting the detected wheel cylinder fluid pressures PWC_i. FIG. 4 is a flowchart showing a logic flow of the calculation of wheel cylinder fluid pressure correction values PWC'_i.

As shown in FIG. 4, the logic flow starts and goes to step S1 in which it is determined whether or not anti-skid brake control is executed. When the answer in step S1 is YES, indicating that the anti-skid brake control is executed, the logic flow goes to step S2.

In step S2, it is determined whether or not control of reducing the wheel cylinder fluid pressures is started. When the answer in step S2 is YES, indicating that the control of reducing the wheel cylinder fluid pressures is started under the condition that the anti-skid brake control is executed, the logic flow goes to step S4.

In step S4, wheel cylinder fluid pressure correction values PWC'_i are set to the wheel cylinder fluid pressures PWC_i detected by wheel cylinder fluid pressure sensors 16 under the condition that the anti-skid brake control is executed. That is, the detected wheel cylinder fluid pressures PWC_i means the wheel cylinder fluid pressures PWC_i at the time at which reduction of wheel cylinder fluid pressures is started.

The logic flow then goes to step S8 in which damping force characteristics DF_i, that is, damping force characteristics DF_FL, DF_FR, DF_RL, DF_RR of shock absorbers 20 on the respective road wheels are set in accordance with the set wheel cylinder fluid pressure correction values PWC'_i. Damping force characteristics DF_i are obtained by the following expression (1):

$$DF\_i = f(PWC'\_i) \quad (1)$$

wherein f represents a map which is set such that if optional wheel cylinder fluid pressure correction values P1 and P2 are expressed as P1<P2, damping force characteristic DF1 with respect to optional wheel cylinder fluid pressure correction value P1 and damping force characteristic DF2 with respect to optional wheel cylinder fluid pressure correction value P2 satisfy the following expressions (a) and (b):

(a) when shock absorber 20 is in the extension stroke, the expression DF1<DF2 is satisfied.

(b) when shock absorber 20 is in the compression stroke, the expression DF1>DF2 is satisfied.

That is, as wheel cylinder fluid pressure correction values PWC'_i become larger, the damping force characteristics are set to harder damping force characteristics, whereas as wheel cylinder fluid pressure correction values PWC'_i become smaller, the damping force characteristics are set to softer damping force characteristics.

When the answer in step S1 is NO, indicating that the anti-skid brake control is not executed, the logic flow jumps to step S7.

In step S7, wheel cylinder fluid pressure correction values PWC'_i are set to the wheel cylinder fluid pressures PWC_i detected by wheel cylinder fluid pressure sensors 16 under the condition that the anti-skid control is not executed. The logic flow then goes to step S8.

When the answer in step S2 is NO, indicating that the control of reducing the wheel cylinder fluid pressures is not started under the condition that the anti-skid brake control is executed, the logic flow goes to step S3.

In step S3, it is determined whether or not wheel cylinder fluid pressures PWC_i detected by wheel cylinder fluid pressure sensors 16 are not less than wheel cylinder fluid pressure correction values PWC'_i previously set. The previously set wheel cylinder fluid pressure correction values PWC'_i means wheel cylinder fluid pressure correction values PWC'_i set at the time at which preceding reduction of the wheel cylinder fluid pressures is started. When the answer in step S3 is YES, indicating that the detected wheel cylinder fluid pressures PWC_i are not less than the previously set wheel cylinder fluid pressure correction values PWC'_i, the logic flow goes to step S5.

In step S5, wheel cylinder fluid pressure correction values is set to the detected wheel cylinder fluid pressures PWC_i. The logic flow then goes to step S8.

When the answer in step S3 is NO, indicating that the detected wheel cylinder fluid pressures PWC_i are less than the previously set wheel cylinder fluid pressure correction values PWC'_i, the logic flow goes to step S6.

In step S6, wheel cylinder fluid pressure correction values PWC'_i is set to the previously set wheel cylinder fluid pressure correction values PWC'_i. The logic flow then goes to step S8.

Figure 5:
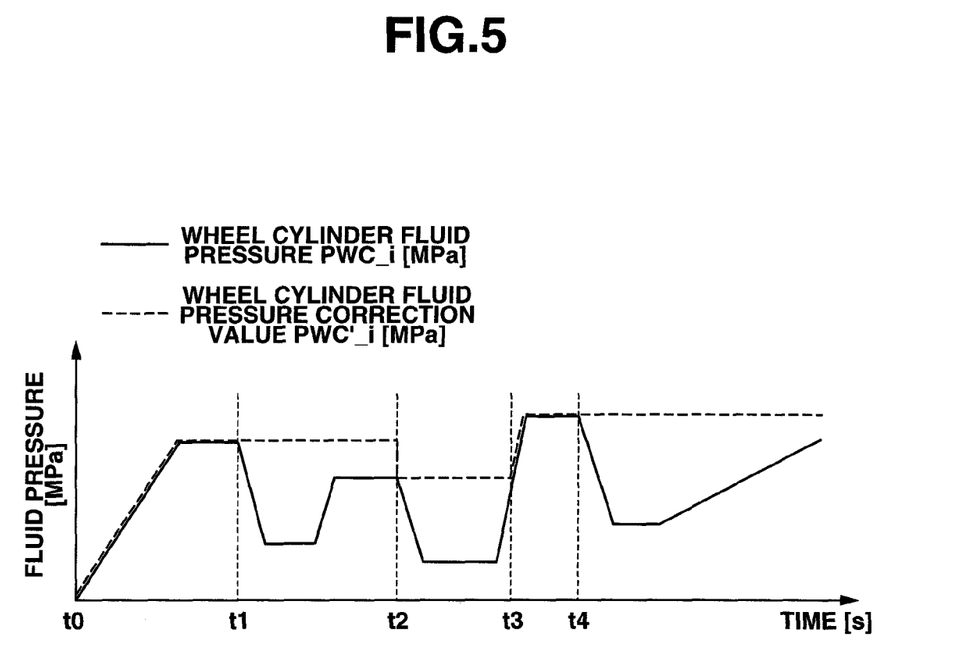
FIG. 5 is a timing chart of a wheel cylinder fluid pressure and a wheel cylinder fluid pressure correction value in the vehicle control apparatus according to the first embodiment of the present invention.

FIG. 5 is a timing chart of wheel cylinder fluid pressures PWC_i and wheel cylinder fluid pressure correction values PWC'_i under the anti-skid brake control in vehicle control apparatus 1.

During a time period from time t0 to time t1, the relationship between wheel cylinder fluid pressures PWC_i and wheel cylinder fluid pressure correction values PWC'_i satisfies the following expression: PWC_i≧PWC'_i. Therefore, in the flowchart as shown in FIG. 4, the logic flow sequentially proceeds through step S1, step S2 and step S3 to step S5 so that wheel cylinder fluid pressure correction values PWC'_i are set to the current wheel cylinder fluid pressures PWC_i which are now being increased.

At time t1, reduction of wheel cylinder fluid pressures PWC_i is started. Therefore, in the flowchart as shown in FIG. 4, the logic flow sequentially proceeds through step S1 and step S2 to step S4 so that wheel cylinder fluid pressure correction values PWC'_i are set to the wheel cylinder fluid pressures PWC_i at the time at which control of reducing the wheel cylinder fluid pressures is started. After beginning to be reduced at time t1, wheel cylinder fluid pressures PWC_i are increased toward time t2.

During a time period from time t1 to time t2, the relationship between wheel cylinder fluid pressures PWC_i and the previously set wheel cylinder fluid pressure correction values PWC'_i satisfies the following expression: PWC_i<PWC'_i. Therefore, in the flowchart as shown in FIG. 4, the logic flow sequentially proceeds through step S1, step S2 and step S3 to step S6 so that wheel cylinder fluid pressure correction values PWC'_i are set to the previously set wheel cylinder fluid pressure correction values PWC'_i.

At time t2, reduction of wheel cylinder fluid pressures PWC_i is started. Therefore, in the flowchart as shown in FIG. 4, the logic flow sequentially proceeds through step S1 and step S2 to step S4 so that wheel cylinder fluid pressure correction values PWC'_i are set to the wheel cylinder fluid pressures PWC_i at the time at which reduction of wheel cylinder fluid pressures PWC_i is started. After that, wheel cylinder fluid pressures PWC_i are increased toward time t3.

During a time period from time t2 to time t3, the relationship between wheel cylinder fluid pressures PWC_i and the previously set wheel cylinder fluid pressure correction values PWC'_i satisfies the following expression: PWC_i<PWC'_i. Therefore, in the flowchart as shown in FIG. 4, the logic flow sequentially proceeds through step S1, step S2 and step S3 to step S6 so that wheel cylinder fluid pressure correction values PWC'_i are set to the previously set wheel cylinder fluid pressure correction values PWC'_i.

After time t3, wheel cylinder fluid pressures PWC_i are kept increased toward time t4. During a time period from time t3 to time t4, the relationship between wheel cylinder fluid pressures PWC_i and the previously set wheel cylinder fluid pressure correction values PWC'_i satisfies the following expression: PWC_i≧PWC'_i. Therefore, in the flowchart as shown in FIG. 4, the logic flow sequentially proceeds through step S1, step S2 and step S3 to step S5 so that wheel cylinder fluid pressure correction values PWC'_i are set to the wheel cylinder fluid pressures PWC_i which are now being increased.

At time t4, reduction of wheel cylinder fluid pressures PWC_i is started. Therefore, in the flowchart as shown in FIG. 4, the logic flow sequentially proceeds through step S1 and step S2 to step S4 so that wheel cylinder fluid pressure correction values PWC'_i are set to the wheel cylinder fluid pressures PWC_i at the time at which control of reducing the wheel cylinder fluid pressures is started.

After time t4, the relationship between wheel cylinder fluid pressures PWC_i and the previously set wheel cylinder fluid pressure correction values PWC'_i satisfies the following expression: PWC_i<PWC'_i. Therefore, in the flowchart as shown in FIG. 4, the logic flow sequentially proceeds through step S1, step S2 and step S3 to step S6 so that wheel cylinder fluid pressure correction values PWC'_i are set to the previously set wheel cylinder fluid pressure correction values PWC'_i.

[Function]

In a case where the damping force characteristic of a shock absorber is controlled on the basis of vehicle attitude, there is a possibility of occurrence of a delay in controlling the damping force characteristic in response to change in the vehicle attitude.

In order to solve the above problem, vehicle control apparatus 1 of the first embodiment is constructed such that as wheel cylinder fluid pressures PWC_i become higher, the damping force characteristics of the respective shock absorbers are set to harder damping force characteristics which have large values of rate of change in damping force with respect to piston speed. Since wheel cylinder fluid pressures PWC_i are varied earlier than the vehicle attitude, control of the damping force characteristics by wheel cylinder fluid pressures PWC_i can be advanced in response as compared to that by the vehicle attitude. Further, in a case where wheel cylinder fluid pressures PWC_i are high, the damping force characteristics are controlled to hard damping force characteristics so that the vehicle attitude can be enhanced in stability. In contrast, in a case where wheel cylinder fluid pressures PWC_i are low, the damping force characteristics are controlled to soft damping force characteristics so that riding comfort of the vehicle can be increased. Further, since wheel cylinder fluid pressures PWC_i are low upon the vehicle running on a road surface having a small friction coefficient, the damping force characteristics are controlled to the soft damping force characteristics so that the running stability can be ensured.

Further, vehicle control apparatus 1 of the first embodiment is constructed such that when wheel cylinder fluid pressures are reduced under a condition that anti-skid brake control is executed, damping force characteristics DF_i are set in accordance with wheel cylinder fluid pressures PWC_i at the time at which reduction of wheel cylinder fluid pressures PWC_i is started. Furthermore, vehicle control apparatus 1 of the first embodiment is constructed such that when wheel cylinder fluid pressures PWC_i are increased under a condition that anti-skid brake control is executed, in a case where wheel cylinder fluid pressures PWC_i are less than the wheel cylinder fluid pressures PWC_i set at the time at which preceding reduction of wheel cylinder fluid pressures PWC_i is started, damping force characteristics DF_i are set in accordance with the wheel cylinder fluid pressures PWC_i set at the time at which preceding reduction of wheel cylinder fluid pressures PWC_i is started.

The control of reducing the wheel cylinder fluid pressures which is performed under anti-skid brake control is executed serves for controlling a slip ratio of respective road wheel speeds to vehicle body speed but not for directly controlling vehicle attitude. That is, the vehicle attitude under anti-skid brake control is changed by increasing the wheel cylinder fluid pressures. Accordingly, it is possible to control the damping force characteristics of shock absorbers 20 in accordance with the vehicle attitude and thereby enhance stability of the vehicle attitude.

Figure 6A:
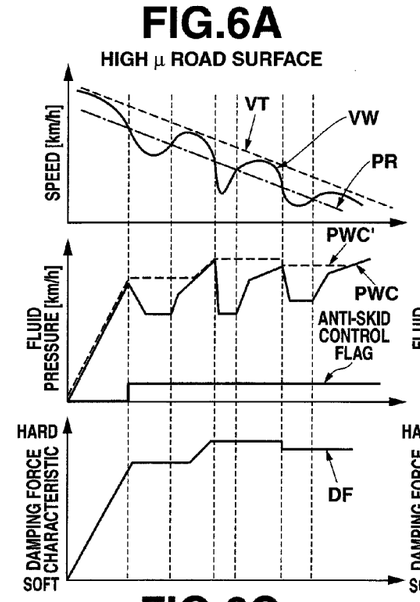
FIGS. 6A to 6D are timing charts of the damping force characteristics of the vehicle control apparatus according to the first embodiment of the present invention.
Figure 6B:
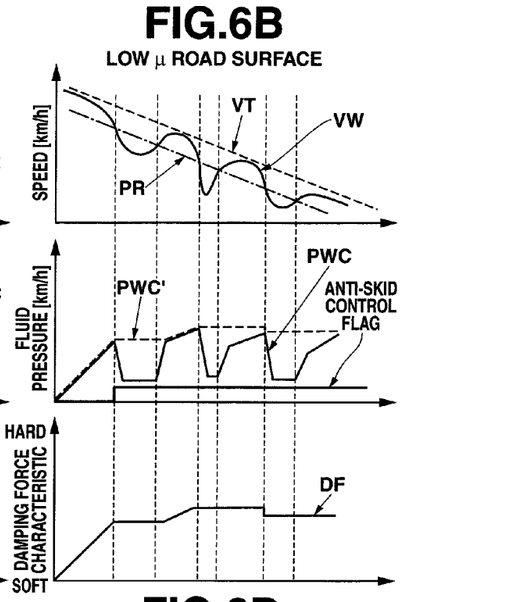
Figure 6C:
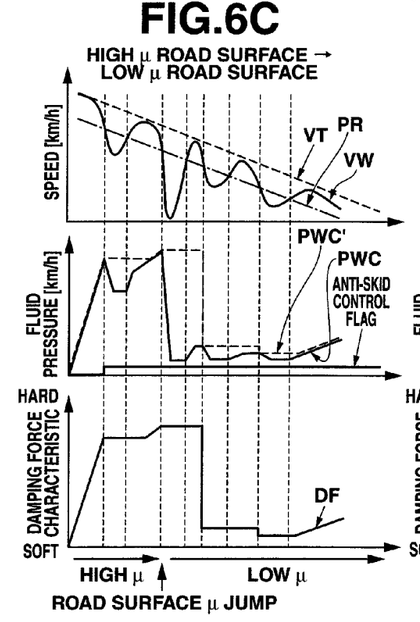
Figure 6D:
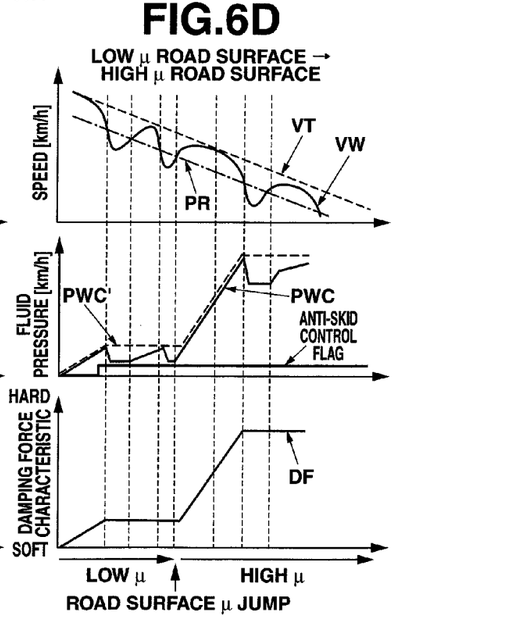

FIG. 6A to FIG. 6D are timing charts of the damping force characteristics of shock absorbers 20 with respect to different values of friction coefficient μ of a road surface. FIG. 6A shows the damping force characteristic with respect to a high value of friction coefficient μ of a road surface. FIG. 6B shows the damping force characteristic with respect to a low value of friction coefficient μ of a road surface. FIG. 6C shows the damping force characteristic upon occurrence of jump from a high value of friction coefficient μ of a road surface to a low value thereof. FIG. 6D shows the damping force characteristic upon occurrence of jump from a low value of friction coefficient μ of a road surface to a high value thereof. In FIG. 6A to FIG. 6D, reference signs VT, VW and PR denote vehicle body speed, representative road wheel speed and representative pressure reduction threshold value, respectively. Reference sign PWC, PWC' and DF denote representative wheel cylinder fluid pressure, representative wheel cylinder fluid pressure correction value, and representative damping force characteristic, respectively.

As shown in FIG. 6A, since wheel cylinder fluid pressure correction value PWC' with respect to a high μ road surface is high, damping force characteristic DF is set to a hard damping force characteristic so that vehicle attitude stability can be precedently enhanced. In contrast, as shown in FIG. 6B, since wheel cylinder fluid pressure correction value PWC' with respect to a low μ road surface is low, damping force characteristic DF is set to a soft damping force characteristic. As a result, running stability of the vehicle can be precedently enhanced. Further, as shown in FIG. 6C, since wheel cylinder fluid pressure correction value PWC' varies from high to low upon occurrence of jump from a high value of friction coefficient μ to a low value thereof, damping force characteristic DF is changed from the hard damping force characteristic to the soft damping force characteristic. As shown in FIG. 6D, since wheel cylinder fluid pressure correction value PWC' varies from low to high upon occurrence of jump from a low value of friction coefficient μ to a high value thereof, damping force characteristic DF is changed from the soft damping force characteristic to the hard damping force characteristic.

[Effects]

Vehicle control apparatus 1 according to the first embodiment can attain the following effects. Vehicle control apparatus 1 includes road wheel speed detecting part 10 (i.e., road wheel speed sensors) which detects road wheel speeds VW_i of respective road wheels of a vehicle, vehicle body speed calculating part 11 which detects vehicle body speed VT of a vehicle body, slip ratio calculating part 12 which calculates slip ratios Slip_i which are ratios of respective road wheel speeds VW_i to vehicle body speed VT, wheel cylinder fluid pressure control part 13 which controls wheel cylinder fluid pressures PWC_i such that slip ratios Slip_i fall within a predetermined range, wheel cylinder fluid pressure acquiring part 16 (i.e., wheel cylinder fluid pressure sensors) which acquires wheel cylinder fluid pressures PWC_i, shock absorbers 20 each disposed between the road wheels and the vehicle body and constructed to variably adjust a damping force characteristic thereof, and damping force characteristic control part 18 which sets respective damping force characteristics DF_i to a harder damping force characteristic as wheel cylinder fluid pressures PWC_i become higher.

Since wheel cylinder fluid pressures PWC_i are varied earlier than vehicle attitude, it is possible to advance a response of control of damping force characteristics DF_i as compared to control thereof due to the change in vehicle attitude. Further, since damping force characteristics DF_i are set to the hard damping force characteristic when wheel cylinder fluid pressures PWC_i are high, attitude stability of the vehicle can be enhanced. On the other hand, since damping force characteristics DF_i are set to a soft damping force characteristic when wheel cylinder fluid pressures PWC_i are low, riding comfort of the vehicle can be increased. Furthermore, since wheel cylinder fluid pressures PWC_i are low when the road wheels run on the road surface having a small friction coefficient, damping force characteristics DF_i are set to the soft damping force characteristic so that running stability of the vehicle can be ensured.

Damping force characteristic control part 18 is configured such that when wheel cylinder fluid pressures PWC_i are reduced under a condition that wheel cylinder fluid pressures PWC_i are controlled by wheel cylinder fluid pressure control part 13, damping force characteristics DF_i are set in accordance with wheel cylinder fluid pressures PWC_i at the time at which the reduction of wheel cylinder fluid pressures PWC_i is started. Damping force characteristic control part 18 is also configured such that when wheel cylinder fluid pressures PWC_i are increased under a condition that wheel cylinder fluid pressures PWC_i are controlled by wheel cylinder fluid pressure control part 13, in a case where the acquired wheel cylinder fluid pressures PWC_i are lower than the wheel cylinder fluid pressures PWC_i set at the time at which preceding reduction of wheel cylinder fluid pressures PWC_i is started, damping force characteristics DF_i are set in accordance with the wheel cylinder fluid pressures PWC_i set at the time at which preceding reduction of wheel cylinder fluid pressures PWC_i is started.

With this configuration, it is possible to control the damping force characteristics of shock absorbers 20 in accordance with vehicle attitude and thereby enhance attitude stability of the vehicle.

Vehicle control apparatus 1 further includes wheel cylinder fluid pressure correction value calculating part 17. Wheel cylinder fluid pressure correction value calculating part 17 is configured such that in a case where wheel cylinder fluid pressures PWC_i are not controlled by wheel cylinder fluid pressure control part 13, wheel cylinder fluid pressure correction values PWC'_i are set to the acquired wheel cylinder fluid pressures PWC_i. Wheel cylinder fluid pressure correction value calculating part 17 is also configured such that when wheel cylinder fluid pressures PWC_i are reduced under a condition that wheel cylinder fluid pressures PWC_i are controlled by wheel cylinder fluid pressure control part 13, wheel cylinder fluid pressure correction values PWC_i are set to wheel cylinder fluid pressures PWC_i at the time at which reduction of wheel cylinder fluid pressures PWC_i is started. Wheel cylinder fluid pressure correction value calculating part 17 is also configured such that when wheel cylinder fluid pressures PWC_i are increased under the condition that wheel cylinder fluid pressures PWC_i are controlled by wheel cylinder fluid pressure control part 13, in a case where the acquired wheel cylinder fluid pressures PWC_i are lower than wheel cylinder fluid pressures PWC'_i at the time at which preceding reduction of wheel cylinder fluid pressures PWC_i is started, wheel cylinder fluid pressure correction values PWC'_i are set to the wheel cylinder fluid pressures PWC'_i set at the time at which preceding reduction of wheel cylinder fluid pressures PWC_i is started. Wheel cylinder fluid pressure correction value calculating part 17 is also configured such that when wheel cylinder fluid pressures PWC_i are increased under the condition that wheel cylinder fluid pressures PWC_i are controlled by wheel cylinder fluid pressure control part 13, in a case where the acquired wheel cylinder fluid pressures PWC_i are not lower than wheel cylinder fluid pressures PWC_i set at the time at which preceding reduction of wheel cylinder fluid pressures PWC_i is started, wheel cylinder fluid pressure correction values PWC'_i are set to the acquired wheel cylinder fluid pressures PWC_i. Damping force characteristic control part 18 is configured to set the damping force characteristics of shock absorbers 20 to the harder damping force characteristic as wheel cylinder fluid pressure correction values PWC'_i become larger.

Further, damping force characteristic control part 18 is also configured to keep the set damping force characteristics until next reduction of wheel cylinder fluid pressures PWC_i is started by wheel cylinder fluid pressure control part 13.

Furthermore, wheel cylinder fluid pressure correction value calculating part 17 is also configured to keep wheel cylinder fluid pressure correction values PWC'_i until next reduction of wheel cylinder fluid pressures PWC_i is started by wheel cylinder fluid pressure control part 13.

With the above configuration, it is possible to control the damping force characteristics of shock absorbers 20 in accordance with vehicle attitude and thereby enhance attitude stability of the vehicle.

In addition, wheel cylinder fluid pressure correction values PWC'_i are set corresponding to values of friction coefficient μ of a road surface on which the vehicle is running. Since wheel cylinder fluid pressure correction values PWC'_i with respect to high μ road surface are set to be larger values, attitude stability of the vehicle can be enhanced. In contrast, since wheel cylinder fluid pressure correction values PWC'_i with respect to low μ road surface are set to be smaller values, running stability of the vehicle can be enhanced by priority.

Other Embodiments

The present invention is not limited to the above-described first embodiment, but various modifications can be made without departing from the scope of the present invention. Although in the first embodiment, wheel cylinder fluid pressures PWC_i are detected using wheel cylinder fluid pressure sensors 16, wheel cylinder fluid pressures PWC_i may be estimated from an amount of a brake pedal stroke or an opening duration of the respective solenoid valves in the hydraulic control unit disposed in the brake hydraulic circuit.

This application is based on a prior Japanese Patent Application No. 2009-214246 filed on Sep. 16, 2009. The entire contents of the Japanese Patent Application No. 2009-214246 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle control apparatus comprising:
a road wheel speed detecting section configured to detect road wheel speeds of respective road wheels of a vehicle;
a vehicle body speed detecting section configured to detect a vehicle body speed;
a slip ratio calculating section configured to calculate slip ratios which are ratios of the respective road wheel speeds with respect to the vehicle body speed;
an anti-skid brake control section configured to control wheel cylinder fluid pressures for respective wheel cylinders such that the slip ratios fall within a predetermined range;
a wheel cylinder fluid pressure acquiring section configured to acquire the wheel cylinder fluid pressures;
damping force variable shock absorbers disposed between the respective road wheels and the vehicle body, the damping force variable shock absorbers being constructed to variably adjust respective damping force characteristics thereof; and
a damping force variable shock absorber control section configured to set the damping force characteristics in accordance with the acquired wheel cylinder fluid pressures.

2. The vehicle control apparatus as claimed in claim 1, wherein the damping force variable shock absorber control section is configured to set the damping force characteristics to harder damping force characteristics as the acquired wheel cylinder fluid pressures become higher.

3. The vehicle control apparatus as claimed in claim 2, wherein the damping force variable shock absorber control section is configured such that when the wheel cylinder fluid pressures are reduced under a condition that the wheel cylinder fluid pressures are controlled by the anti-skid brake control section, the damping force characteristics are set in accordance with the wheel cylinder fluid pressures at a time at which reduction of the wheel cylinder fluid pressures is started.

4. The vehicle control apparatus as claimed in claim 3, wherein the damping force variable shock absorber control section is configured to keep the set damping force characteristics until next reduction of the wheel cylinder fluid pressures is started by the anti-skid brake control section.

5. The vehicle control apparatus as claimed in claim 2, wherein the damping force variable shock absorber control section is configured such that when the wheel cylinder fluid pressures are increased under a condition that the wheel cylinder fluid pressures are controlled by the anti-skid brake control section, in a case where the acquired wheel cylinder fluid pressures are lower than the wheel cylinder fluid pressures set at a time at which preceding reduction of the wheel cylinder fluid pressures is started, the damping force characteristics are set in accordance with the wheel cylinder fluid pressures set at the time at which preceding reduction of the wheel cylinder fluid pressures is started.

6. The vehicle control apparatus as claimed in claim 2, further comprising a wheel cylinder fluid pressure correction value calculating section,
wherein the wheel cylinder fluid pressure correction value calculating section is configured such that under a condition that the wheel cylinder fluid pressures are not controlled by the anti-skid brake control section, wheel cylinder fluid pressure correction values are set to the acquired wheel cylinder fluid pressures, and the wheel cylinder fluid pressure correction value calculating section is configured such that when the wheel cylinder fluid pressures are reduced under a condition that the wheel cylinder fluid pressures are controlled by the anti-skid brake control section, the wheel cylinder fluid pressure correction values are set to the wheel cylinder fluid pressures at a time at which reduction of the wheel cylinder fluid pressures is started, and
wherein the damping force variable shock absorber control section is configured to set the damping force characteristics in accordance with the wheel cylinder fluid pressure correction values.

7. The vehicle control apparatus as claimed in claim 6, wherein the damping force variable shock absorber control section is configured to set the damping force characteristics to harder damping force characteristics as the wheel cylinder fluid pressure correction values become higher.

8. The vehicle control apparatus as claimed in claim 2, further comprising a wheel cylinder fluid pressure correction value calculating section,
wherein the wheel cylinder fluid pressure correction value calculating section is configured such that when the wheel cylinder fluid pressures are increased under the condition that the wheel cylinder fluid pressures are controlled by the anti-skid brake control section, in a case where the acquired wheel cylinder fluid pressures are lower than the wheel cylinder fluid pressures set at a time at which preceding reduction of the wheel cylinder fluid pressures is started, wheel cylinder fluid pressure correction values are set to the wheel cylinder fluid pressures set at the time at which preceding reduction of the wheel cylinder fluid pressures is started, and the wheel cylinder fluid pressure correction value calculating section is configured such that when the wheel cylinder fluid pressures are increased under the condition that the wheel cylinder fluid pressures are controlled by the anti-skid brake control section, in a case where the acquired wheel cylinder fluid pressures are not lower than the wheel cylinder fluid pressures set at the time at which preceding reduction of the wheel cylinder fluid pressures is started, the wheel cylinder fluid pressure correction values are set to the acquired wheel cylinder fluid pressures, and wherein the damping force variable shock absorber control section is configured to set the damping force characteristics in accordance with the wheel cylinder fluid pressure correction values.

9. The vehicle control apparatus as claimed in claim 8, wherein the damping force variable shock absorber control section is configured to set the damping force characteristics to harder damping force characteristics as the wheel cylinder fluid pressure correction values become higher.

10. The vehicle control apparatus as claimed in claim 9, wherein the wheel cylinder fluid pressure correction values are set corresponding to values of friction coefficient $\mu$ of a road surface on which the vehicle is running.

11. A vehicle control apparatus comprising:
road wheel speed sensors which detect road wheel speeds of respective road wheels of a vehicle;
a vehicle body speed calculating section configured to calculate a vehicle body speed on the basis of the detected road wheel speeds;
a slip ratio calculating section configured to calculate slip ratios which are ratios of the respective road wheel speeds with respect to the vehicle body speed;
an anti-skid brake control section configured to control wheel cylinder fluid pressures for respective wheel cylinders such that the slip ratios fall within a predetermined range;
a wheel cylinder fluid pressure acquiring section configured to acquire the wheel cylinder fluid pressures;
a wheel cylinder fluid pressure correction value calculating section configured to correct the acquired wheel cylinder fluid pressures in accordance with an operating state of the anti-skid brake control section;
damping force variable shock absorbers disposed between the respective road wheels and the vehicle body, the damping force variable shock absorbers being constructed to variably adjust respective damping force characteristics thereof; and
a damping force variable shock absorber control section configured to set the damping force characteristics in accordance with wheel cylinder fluid pressure correction values obtained as the corrected wheel cylinder fluid pressures.

12. The vehicle control apparatus as claimed in claim 11, wherein the damping force variable shock absorber control section is configured to set the damping force characteristics to harder damping force characteristics as the wheel cylinder fluid pressure correction values become higher, and set the damping force characteristics to softer damping force characteristics as the wheel cylinder fluid pressure correction values become lower.

13. The vehicle control apparatus as claimed in claim 12, wherein the wheel cylinder fluid pressure correction value calculating section is configured such that when the wheel cylinder fluid pressures are increased under a condition that the wheel cylinder fluid pressures are controlled by the anti-skid brake control section, in a case where the acquired wheel cylinder fluid pressures are lower than the wheel cylinder fluid pressures set at a time at which preceding reduction of the wheel cylinder fluid pressures is started, the wheel cylinder fluid pressure correction values are set to the wheel cylinder fluid pressures set at the time at which preceding reduction of the wheel cylinder fluid pressures is started, and the wheel cylinder fluid pressure correction value calculating section is configured such that when the wheel cylinder fluid pressures are increased under the condition that the wheel cylinder fluid pressures are controlled by the anti-skid brake control section, in a case where the acquired wheel cylinder fluid pressures are not lower than the wheel cylinder fluid pressures set at the time at which preceding reduction of the wheel cylinder fluid pressures is started, the wheel cylinder fluid pressure correction values are set to the acquired wheel cylinder fluid pressures.

14. The vehicle control apparatus as claimed in claim 13, wherein the wheel cylinder fluid pressure correction value calculating section is configured such that when the wheel cylinder fluid pressures are reduced under a condition that the wheel cylinder fluid pressures are controlled by the anti-skid brake control section, the wheel cylinder fluid pressure correction values are set to the wheel cylinder fluid pressures at a time at which reduction of the wheel cylinder fluid pressures is started.

15. The vehicle control apparatus as claimed in claim 14, wherein the wheel cylinder fluid pressure correction value calculating section is configured to keep the wheel cylinder fluid pressure correction values until next reduction of the wheel cylinder fluid pressures is started by the anti-skid brake control section.

16. The vehicle control apparatus as claimed in claim 15, wherein the wheel cylinder fluid pressure correction values are set corresponding to values of friction coefficient $\mu$ of a road surface on which the vehicle is running.

17. A vehicle control apparatus comprising:
a road wheel speed detecting means for detecting road wheel speeds of respective road wheels of a vehicle;
a vehicle body speed detecting means for detecting a vehicle body speed;
a slip ratio calculating means for calculating slip ratios which are ratios of the respective road wheel speeds with respect to the vehicle body speed;
an anti-skid brake control means for controlling wheel cylinder fluid pressures for respective wheel cylinders such that the slip ratios fall within a predetermined range;
a wheel cylinder fluid pressure acquiring means for acquiring the wheel cylinder fluid pressures;
damping force variable shock absorbers disposed between the respective road wheels and the vehicle body, the damping force variable shock absorbers being constructed to variably adjust respective damping force characteristics thereof; and
a damping force variable shock absorber control means for setting the damping force characteristics to harder damping force characteristics as the acquired wheel cylinder fluid pressures become higher.

18. The vehicle control apparatus as claimed in claim 17, wherein the damping force variable shock absorber control means operates to set the damping force characteristics to softer damping force characteristics as the acquired wheel cylinder fluid pressures become lower.

19. The vehicle control apparatus as claimed in claim 18, wherein the damping force variable shock absorber control means operates such that when the wheel cylinder fluid pressures are reduced under a condition that the wheel cylinder fluid pressures are controlled by the anti-skid brake control means, the damping force characteristics are set in accordance with the wheel cylinder fluid pressures at a time at which reduction of the wheel cylinder fluid pressures is started, and
the damping force variable shock absorber control means operates such that when the wheel cylinder fluid pressures are increased under the condition that the wheel cylinder fluid pressures are controlled by the anti-skid brake control means, in a case where the acquired wheel cylinder fluid pressures are lower than wheel cylinder fluid pressures set at a time at which preceding reduction of the wheel cylinder fluid pressures is started, the damping force characteristics are set in accordance with the wheel cylinder fluid pressures set at the time at which preceding reduction of the wheel cylinder fluid pressures is started.

20. The vehicle control apparatus as claimed in claim 19, further comprising a wheel cylinder fluid pressure correction value calculating means for calculating wheel cylinder fluid pressure correction values for the respective wheel cylinders, wherein the wheel cylinder fluid pressure correction value calculating means operates such that under a condition that the wheel cylinder fluid pressures are not controlled by the anti-skid brake control means, the wheel cylinder fluid pressure correction values are set to the acquired wheel cylinder fluid pressures, the wheel cylinder fluid pressure correction value calculating means operates such that when the wheel cylinder fluid pressures are reduced under the condition that the wheel cylinder fluid pressures are controlled by the anti-skid brake control means, the wheel cylinder fluid pressure correction values are set to the wheel cylinder fluid pressures at the time at which reduction of the wheel cylinder fluid pressures is started, and the wheel cylinder fluid pressure correction value calculating means operates such that when the wheel cylinder fluid pressures are increased under the condition that the wheel cylinder fluid pressures are controlled by the anti-skid brake control means, in a case where the acquired wheel cylinder fluid pressures are lower than the wheel cylinder fluid pressures set at the time at which preceding reduction of the wheel cylinder fluid pressures is started, the wheel cylinder fluid pressure correction values are set to the wheel cylinder fluid pressures set at the time at which preceding reduction of the wheel cylinder fluid pressures is started, and the wheel cylinder fluid pressure correction value calculating means operates such that when the wheel cylinder fluid pressures are increased under the condition that the wheel cylinder fluid pressures are controlled by the anti-skid brake control means, in a case where the acquired wheel cylinder fluid pressures are not lower than the wheel cylinder fluid pressures set at the time at which preceding reduction of the wheel cylinder fluid pressures is started, the wheel cylinder fluid pressure correction values are set to the acquired wheel cylinder fluid pressures, and wherein the damping force variable shock absorber control means operates to set the damping force characteristics to harder damping force characteristics as the wheel cylinder fluid pressure correction values become higher.

* * * * *